United States Patent [19]

Mita

[11] Patent Number: 5,193,768

[45] Date of Patent: Mar. 16, 1993

[54] MOUNTING STRUCTURE FOR MOUNTING AN INSTRUMENT ON A SUPPORTING MEMBER OF A MOTOR VEHICLE

[75] Inventor: Katsumi Mita, Saitama, Japan

[73] Assignee: Pioneer Electronic Corporation, Tokyo, Japan

[21] Appl. No.: 861,684

[22] Filed: Apr. 1, 1992

[30] Foreign Application Priority Data

May 29, 1991 [JP] Japan .................................. 3-154084

[51] Int. Cl.5 ................................................ G12B 9/00
[52] U.S. Cl. ...................................... 248/27.1; 70/57; 361/419
[58] Field of Search ...................... 248/27.1, 27.3, 906, 248/551; 361/419; 211/26; 70/57, 58; 174/58; 220/3.9

[56] References Cited

U.S. PATENT DOCUMENTS

| | | | |
|---|---|---|---|
| 4,180,226 | 12/1979 | Matte | 220/3.9 X |
| 4,572,465 | 2/1986 | Rasca | 174/58 X |
| 4,623,110 | 11/1986 | Kanari | 248/27.1 |
| 4,732,281 | 3/1988 | Hall | 211/26 |
| 4,947,661 | 8/1990 | Yoshida | 70/57 X |
| 5,020,748 | 6/1991 | Okajima | 361/419 X |
| 5,106,039 | 4/1992 | Gross | 248/27.1 |

Primary Examiner—J. Franklin Foss
Attorney, Agent, or Firm—Nikaido, Marmelstein, Murray & Oram

[57] ABSTRACT

A structure is provided for securing a casing of a car stereo on a periphery of an opening formed in a dashboard of a motor vehicle. A screw is rotatably supported in the casing by supporting members, and a movable member is engaged with the screw to be moved along the screw by rotating the screw. A clamping member is pivotally and axially movably mounted on the screw. When the movable member is moved, and engages with the clamping member, the clamping member is pivoted and axially moved. The clamping member has an arm and a clamping portion provided to be abutted on an inside wall of the dashboard when the clamping member is pivoted and axially moved, whereby clamping the dashboard. The arm has an engaging projection which is engaged with a side wall of the casing so that the clamping member is prevented from deforming.

1 Claim, 9 Drawing Sheets

MOUNTING STRUCTURE FOR MOUNTING AN INSTRUMENT ON A SUPPORTING MEMBER OF A MOTOR VEHICLE

BACKGROUND OF THE INVENTION

The present invention relates to a mounting structure for mounting an instrument such as a car stereo on a member of a motor vehicle, for example on a dashboard.

The operation for mounting the instrument on the dashboard must be performed at the front and rear sides of the dashboard, which requires much manual labor and time.

FIGS. 15 to 17 show a mounting structure to solve such a problem. In FIG. 15, reference numeral 5 designates a supporting member formed on a casing 6 of a car stereo and 7 is a nose portion of the car stereo. A screw 8 is rotatably supported on the supporting member 5. A movable member 9 is engaged with the screw 8, and a clamping member 10 is slidably mounted on the screw 8. The movable member 9 is prevented from revolving about the screw 8 by the supporting member 5. The clamping member 10 has a clamping portion 10a and a pair of projecting arms 10b projected from the clamping portion 10a. The clamping portion 10a is slidably engaged with an elongated opening 6a formed on the casing 6.

At a first position, the clamping portion 10a of the clamping member 10 is received in the elongated opening 6a of the casing 6.

The casing 6 of the car stereo is inserted in a dashboard P and projections 6b of the casing 6 is abutted on the underside of the dashboard P. The screw 8 is rotated with a lever (not shown), so that the movable member a is moved in the direction Y. Thus, the movable member 9 abuts on the projecting arms 10b so that the arms 10b are pushed in the Y direction. Since the arms 10b are inclined toward the movable member 9, the arms 10b are moved to the left and in the Y direction.

When the arms 10b are deflected to the left, the clamping member 10 is swung about the screw 8 so that the clamping portion 10a is removed from the elongated opening 6a of the casing 6 as shown in FIG. 16.

When the movable member 9 is further moved in the Y direction, the clamping portion 10a abuts on the inside wall of the dashboard panel P. As a result, the clamping member 10 clamps the dashboard panel P together with the projections 6b to fix the casing 6 of the stereo as shown in FIG. 17.

In the mounting structure, the force of the movable member 9 is exerted on the arms 10b so that the clamping member 10 may be deformed as shown in FIG. 18. Accordingly, the supporting force of the clamping portion 10a exerted on the dashboard panel P is reduced and a rigid clamping effect can not be provided. Further, if the clamping member 10 is deformed, the clamping portion 10a is not engaged with the opening 6a of the casing 6 at the first position shown in FIG. 15, thereby obstructing mounting and removing operations of the instrument.

SUMMARY OF THE INVENTION

An object of the present invention is to provide a mounting structure which may easily and reliably mount an instrument on a supporting member of a motor vehicle.

According to the present invention, there is provided a mounting structure for securing a casing of an instrument on a periphery of an opening formed in a board member of a motor vehicle, comprising projections formed on the casing so as to abut on an outside of the periphery when the casing is inserted in an inside space behind the board member passing through the opening, a front side supporting member and a rear side supporting member formed on the casing, a screw rotatably supported in the casing by the supporting members, a movable member engaged with the screw and provided to be moved along the screw by rotating the screw, and a clamping member mounted on the screw.

The clamping member has an engaging portion disposed between the rear side supporting member and the movable member and axially slidably mounted on the screw and pivotably engaged thereon so that the clamping member may be pivoted in a plane including an axis of the screw, a clamping portion which is provided to be projected from the casing as the clamping member pivots in the plane, arms provided to be engaged with the movable member at an upper face thereof to cause an axial movement and pivoting of the clamping member, each arm having an engaging projection to be engaged with a side wall of the casing for preventing the clamping member from further pivoting, and the clamping portion being provided to be abutted on an inside wall of the board member when the clamping member is pivoted and axially moved. Thus, the board member is clamped by the clamping member and the projections.

In an aspect of the invention, a guide member is provided integrally with the rear side supporting member for guiding the clamping member so as to pivot it.

In the mounting structure of the present invention, the movable member is moved in the forward direction by rotating the screw. The movable member abuts on the projecting arms of the clamping member so that the clamping member is pivoted and the clamping portion of the clamping member is projected from the casing. As the movable member is further moved, the clamping portion abuts on the inside wall of the board member. Thus, the casing of the instrument is secured to the board member. At that time, the pivoting of the clamping member is restricted by the engaging projections provided on the projecting arms.

The force of the movable member by the screw is exerted on the clamping member. The clamping member is prevented from deforming by the engaging projection. Thus, the instrument can be secured to the board member with a large clamping force.

Since the deformation of the clamping member is prevented by the engaging projections of the arms, the clamping portion is prevented from deflecting from the casing in the first position. Consequently, the casing is removed from the board member without inconvenience.

The other objects and features of this invention will become understood from the following description with reference to the accompanying drawings.

DETAILED DESCRIPTION OF THE PREFERRED EMBODIMENT

Figure 1:
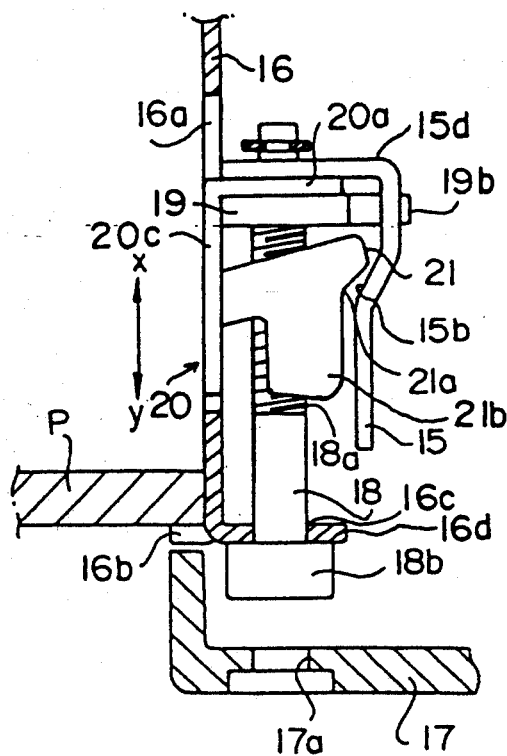
FIG. 1 is a sectional view taken along a line I—I of FIG. 3, showing a mounting structure of a car stereo according to the present invention.

Referring to FIGS. 1 to 5 showing a mounting structure for a car stereo according to the present invention, since the mounting structures are symmetrically provided in a casing of the car stereo, only the mounting structures on the left is described in the drawings.

Referring to FIG. 1, a casing of a car stereo to be mounted in a dashboard panel P of a motor vehicle has a side plate 16, a guide member 15 secured to the side plate 16, and a nose portion 17 provided in front of the casing for covering the guide member 15. These members are secured to each other to form the casing.

Figure 2:
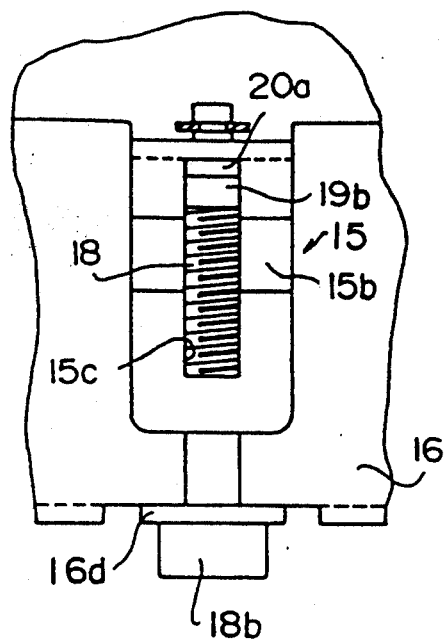
FIG. 2 is a right side view of the mounting structure.
Figure 5:
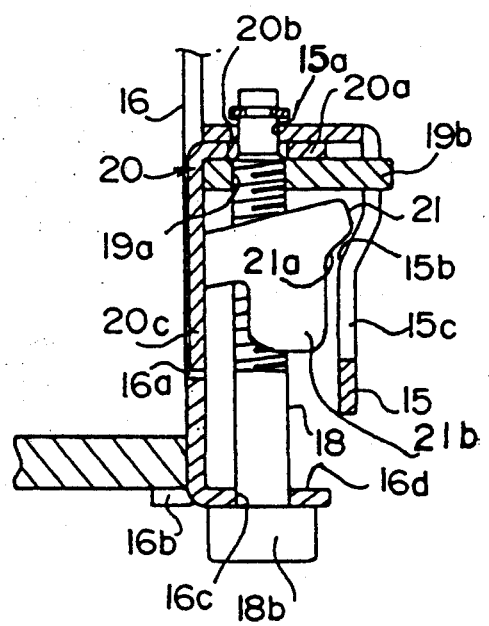
FIG. 5 is a sectional view of the mounting structure of FIG. 1.

The guide member 15 has an L-shaped section comprising a supporting portion 15d and a leg portion 15e. The supporting portion 15d is secured to the side plate 16 perpendicularly to the side plate 16 and has a hole 15a as shown in FIG. 5 for supporting a screw 18. The leg portion 15e is provided extending from the supporting portion 15d perpendicularly to the supporting portion 15d. The leg portion 15e has a slant portion 15b provided in a central portion thereof inclined toward the side plate 16 and an elongated guide slit 15c formed in the longitudinal direction thereof as shown in FIG. 2.

Figure 3:
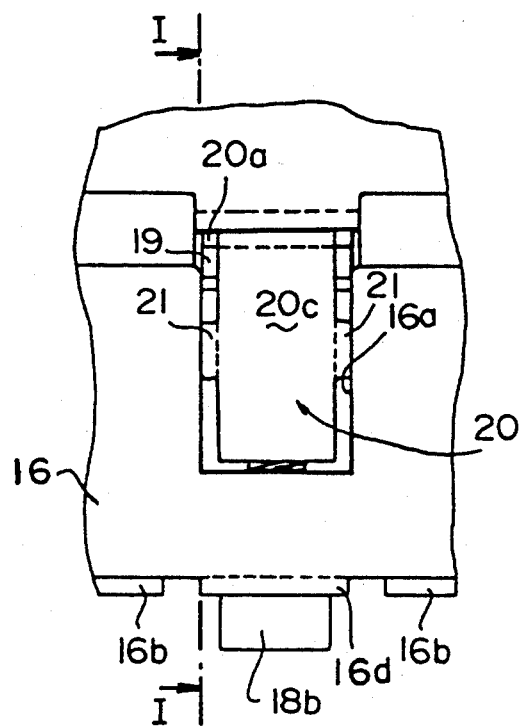
FIG. 3 is a left side view of the mounting structure.
Figure 4:
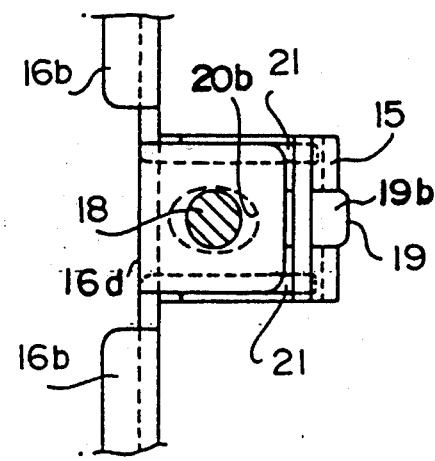
FIG. 4 is a front view of the mounting structure.

Referring to FIGS. 3 and 4, the side plate 16 has an elongated opening 16a, a pair of front bent portions outwardly bent to form engaging projections 16b which are engaged with the periphery of the dashboard panel P, and an inner bent supporting portion 16d. A hole 16c is formed in the supporting portion 16d for supporting the screw 18.

The nose portion 17 has a hole 17a for inserting a hexagonal lever (not shown).

The screw 18 having a hexagon socket head is inserted into the hole 16c of the supporting portion 16d and into the hole 15a of the guide member 15 protruded from the hole 15a. The screw 18 has an annular groove formed at an end portion thereof to which an E-ring is secured for restricting the axial movement of the screw 18. Thus, the screw 18 is rotatably supported by the guide member 15. The screw 18 has a thread 18a formed on a part thereof on which a movable member 19 is engaged.

The movable member 19 has a threaded hole 19a engaged with the thread 18a and a sliding portion 19b slidably engaged with the guide slit 15c of the guide member 15. Thus, the movable member 19 is prevented from revolving together with the screw 18. When the screw 18 is rotated by the hexagonal lever, the movable member 19 is moved in either direction shown by an arrow X or Y while the sliding portion 19b slides on the inner guide walls of the guide slit 15c.

Referring to FIG. 5, a clamping member 20 having an L-shaped section is axially slidably mounted on the thread 18a of the screw 18 between the supporting portion 15d of the guide member 15 and the movable member 19. The clamping member 20 comprises an engaging portion 20a having a hole 20b in the shape of an ellipse (FIG. 4) which is loosely fitted the thread 18, and a clamping portion 20c provided perpendicularly extending from the engaging portion 20a. The diameter of the hole 20b is slightly larger than the external diameter of the thread 18a, so that the clamping member 20 may be pivoted in a plane including the axis of the screw 18. As shown in FIG. 3, the clamping portion 20c is slidably engaged with the elongated opening 16a of the side plate 16.

Further, the clamping portion 20c is provided with a pair of projecting arms 21 extending from opposite sides thereof toward the movable member 19. Each arm 21 has a length to make a contact with the slant portion 15b of the guide member 15 at an end portion 21a thereof, and an engaging projection 21b vertically projected from the lower portion thereof.

The operation for mounting the casing in the dashboard panel will be described hereinafter with reference to FIGS. 6 to 9.

Figure 6:
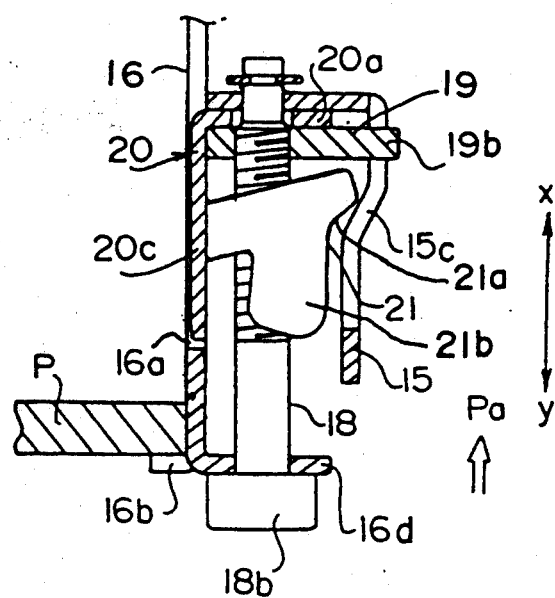
FIGS. 6 to 9 are explanatory sectional views showing mounting operation.

First, the clamping portion 20c of the clamping member 20 is engaged with the elongated opening 16a of the side plate 16. In this state, the casing of the car stereo is inserted in an opening Pa formed in the dashboard panel P until the engaging projections 16b abut of the periphery of the dashboard panel P (FIG. 6).

Figure 7:
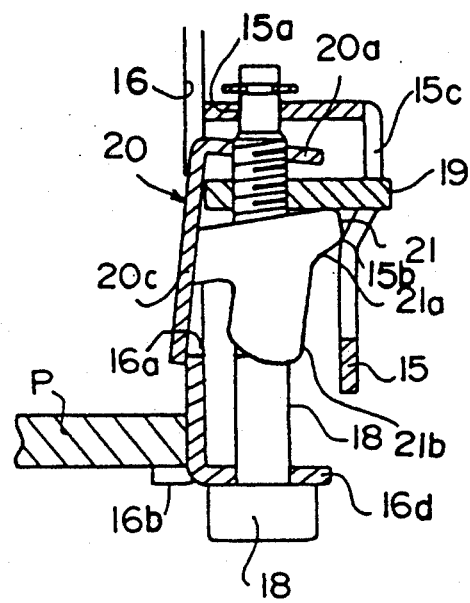

The screw 18 is rotated in the clockwise direction with the hexagonal lever engaged with a hexagonal hole of the hexagon socket head 18b so that the movable member 19 is moved in the direction shown by the arrow Y, that is the forward direction. Thus, the movable member 19 abuts on the tip ends of the projecting arms 21 so that the arms 21 are pushed in the Y direction. Since the arms 21 are inclined toward the movable member 19 and the end portions 21a contact with the slant portion 15b, the arms 21 are moved to the left and in the Y direction as shown in FIG. 7.

When the arms 21 are deflected to the left, the clamping member 20 is swung in the clockwise direction about the hole 20b engaged with the screw 18 so that the clamping portion 20c is removed from the opening 16a.

When the movable member 19 is further moved in the Y direction, the movable member 19 abuts on the back side of each arm 21, where the arms 21 are parallel with the dashboard panel P. At that time, the engaging projection 21b abuts on the inside wall of the side plate 16 so that the clamping member 20 is prevented from further pivoting.

Figure 8:
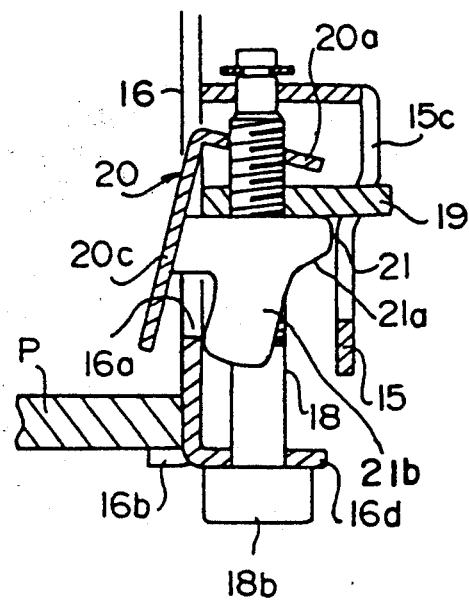

The clamping member 20 is moved in the Y direction in this state (FIG. 8).

Figure 9:
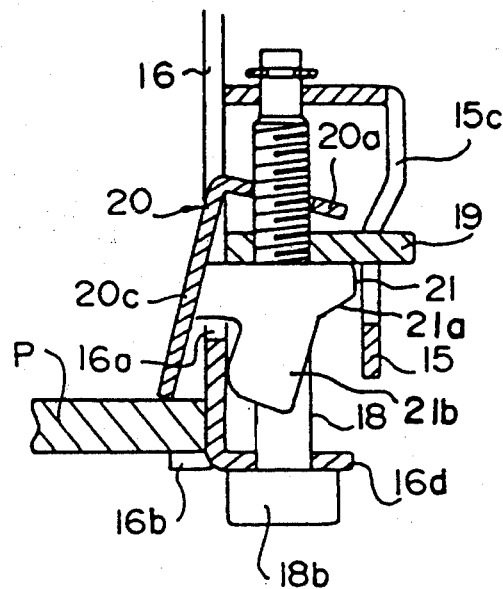

At last, the projecting end of the clamping member 20 abuts on the inside wall of the dashboard panel P. If the movable member 19 is further moved in the Y direction, the clamping member 20 clamps firmly the dashboard panel P together with the engaging projections 16b (FIG. 9).

The force of the movable member 19 is uniformly exerted on the arms 21 so that the supporting force of the clamping portion 20c exerted on the dashboard panel P is ensured to provide a rigid clamping effect. Since the engaging projections 21b of the arms 21 abut on the side plate 16 for restricting the pivoting of the clamping portion 20c, the clamping member 20 is prevented from deforming caused by the force of the screw 18. After the car stereo is mounted in the dashboard panel, the hole 17a (FIG. 1) is covered by a plastic cover (not shown).

Figure 10:
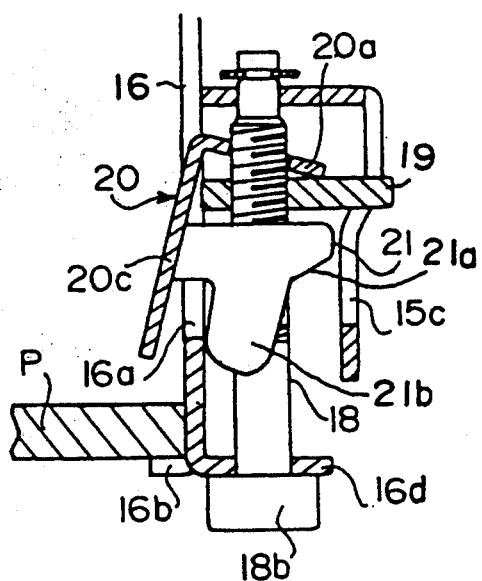
FIGS. 10 to 13 are explanatory sectional view showing removing operation.

In order to remove the casing from the dashboard panel P with reference to FIGS. 10 to 13, the screw 18 is rotated in the counterclockwise direction by the hexagonal lever. The movable member 19 is moved in the direction shown by the arrow X so that the movable member 19 abuts on the periphery of the engaging portion 20a to push the engaging portion 20a in the X direction (FIG. 10).

Figure 11:
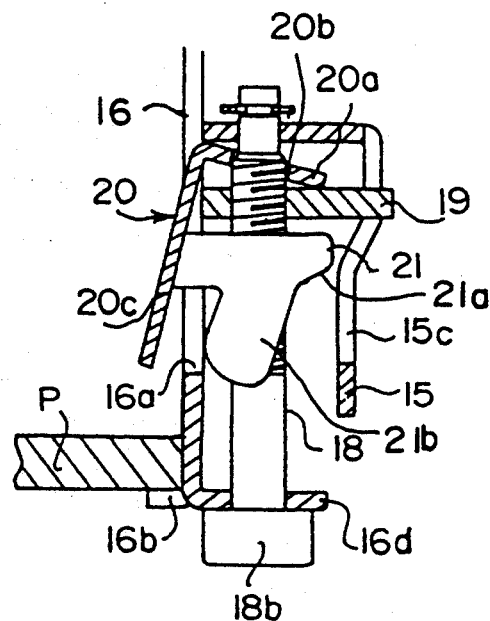
Figure 12:
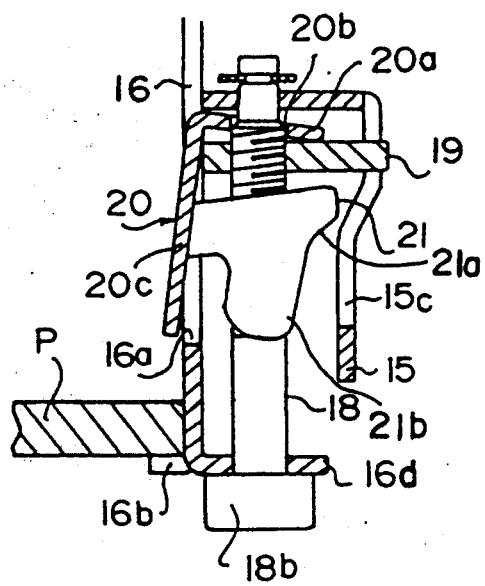

The movable member 19 is continuously moved in the X direction, the corner of the clamping member 20 abuts on the supporting portion 15d so that the movement of the clamping member 20 is restricted (FIG. 11). If the movable member 19 is further moved in the X direction, the clamping member 20 is swung in the counterclockwise direction about the corner as a fulcrum. As a result, the engaging portion 20a is moved toward the supporting portion 15d of the guide member 15 to withdraw the clamping portion 20c (FIG. 12).

Figure 13:
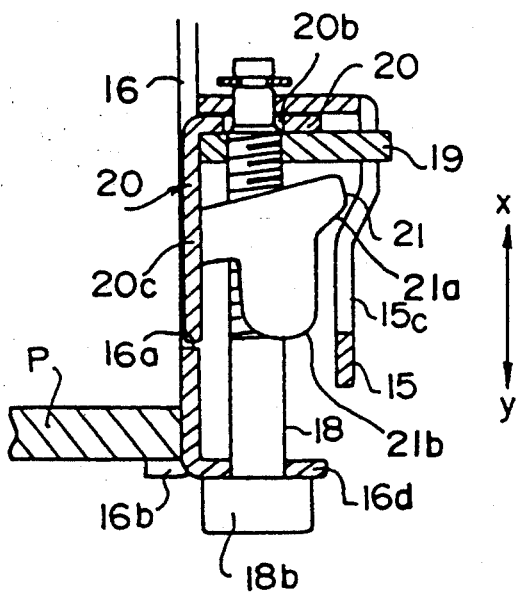

Finally, the engaging portion 20a engages with the supporting portion 15d, and is supported by the movable member 19. The clamping portion 20c engages with the elongated opening 16a (FIG. 13). The casing can be pulled and released from the opening Pa of the dashboard panel P without inconvenience.

Figure 14:
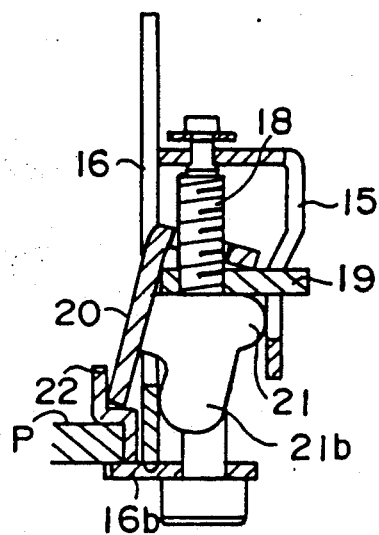
FIG. 14 is a front view showing a modification of the mounting structure of the present invention.
Figure 15:
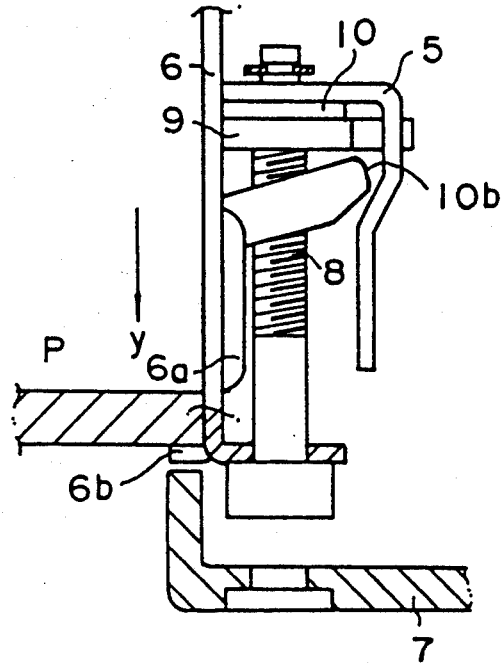
FIGS. 15 to 18 are sectional views showing a prior art of the mounting structure.
Figure 16:
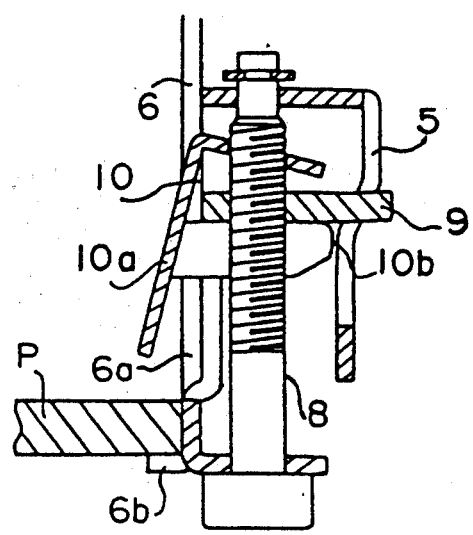
Figure 17:
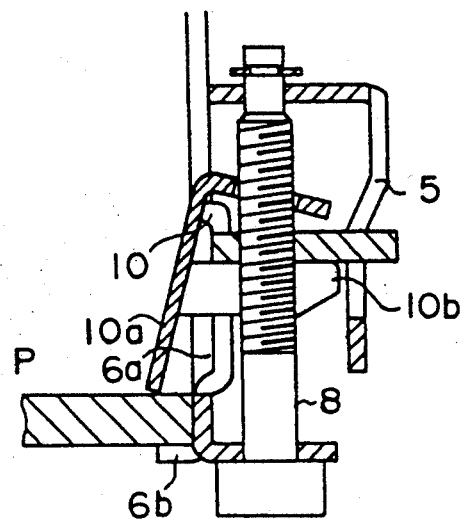
Figure 18:
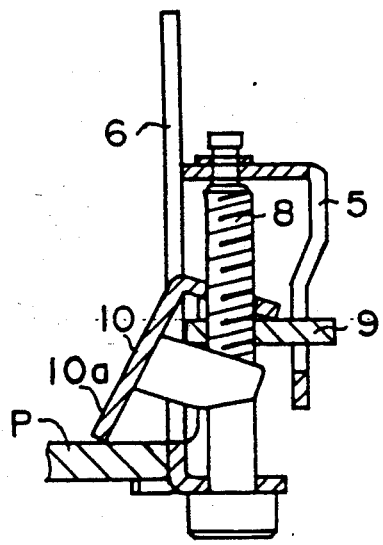

Referring to FIG. 14 showing the modification of the mounting structure, a damping member 22 made of plastic is provided on the edge of the opening Pa of the dashboard panel P. The projecting end of the clamping portion 20c abuts on the damping member 22. Thus, the dashboard panel P is prevented from biting by the clamping portion 20c and the pivoting of the clamping portion is prevented in cooperation with the engaging projections 21b. The prevention of the deformation of the clamping member is further ensured.

In accordance with the present invention, the casing of the car stereo is mounted on or removed from the dashboard panel by rotating the screw mounted in the casing. The clamping member 20 is provided with the engaging projection 21b for restricting the pivoting of the clamping member, thereby preventing the member from deforming by the force of the screw. When the clamping portion 20c of the clamping member is engaged with the elongated hole of the casing in the first position, the clamping portion is not deflected from the casing. Thus, the mounting and removing operations of the casing are easily and ensurely performed at the front of the casing.

Since the casing is rigidly mounted on the dashboard panel with a large clamping force, the vibration of the car stereo in the casing caused by the vibration of the motor vehicle is reduced, thereby preventing damage of electronic parts of the car stereo.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A mounting structure for securing a casing of an instrument on a periphery of an opening formed in a board member of a motor vehicle, comprising:
   projections formed on the casing so as to abut on an outside of said periphery when the casing is inserted in an inside space behind the board member passing through the opening;
   a front side supporting member and a rear side supporting member formed on the casing;
   a screw rotatably supported in the casing by said supporting members;
   a movable member engaged with the screw and provided to be moved along the screw by rotating the screw; and
   a clamping member having an engaging portion disposed between said rear side supporting member and said movable member and axially slidably mounted on the screw and pivotably engaged thereon so that the clamping member may be pivoted in a plane including an axis of the screw, a clamping portion which is provided to be projected from the casing as the clamping member pivots in said plane, arms provided to be engaged with the movable member to cause an axial movement and pivoting of the clamping member, each arm having an engaging projection to be abutted on a side wall of the casing for preventing the clamping member from further pivoting, and the clamping portion being provided to be abutted on an inside wall of the board member when the clamping member is pivoted and axially moved, whereby clamping the board member together with said projections.

* * * * *